(12) United States Patent
    Bustle

(10) Patent No.: US 11,207,761 B2
(45) Date of Patent: Dec. 28, 2021

(54) SOCKET FOR DRIVING ASYMMETRIC FASTENER HEADS

(71) Applicant: Carl Bustle, Brodhead, KY (US)

(72) Inventor: Carl Bustle, Brodhead, KY (US)

( * ) Notice: Subject to any disclaimer, the term of this patent is extended or adjusted under 35 U.S.C. 154(b) by 260 days.

(21) Appl. No.: 16/218,400

(22) Filed: Dec. 12, 2018

(65) Prior Publication Data
    US 2019/0176297 A1    Jun. 13, 2019

Related U.S. Application Data

(60) Provisional application No. 62/597,547, filed on Dec. 12, 2017.

(51) Int. Cl.
    *B25B 13/06* (2006.01)
    *F16B 23/00* (2006.01)
    *B25B 15/00* (2006.01)

(52) U.S. Cl.
    CPC ........ *B25B 13/065* (2013.01); *F16B 23/0046* (2013.01); *B25B 15/004* (2013.01); *F16B 23/0061* (2013.01)

(58) Field of Classification Search
    CPC .................................................. B25B 13/5091
    USPC ............................................................ 81/121
    See application file for complete search history.

(56) References Cited

U.S. PATENT DOCUMENTS

| | | | |
|---|---|---|---|
| 5,809,851 A * | 9/1998 | Thompson | B25B 13/48 81/124.2 |
| 2005/0132847 A1 * | 6/2005 | Garg | B25B 13/06 81/121.1 |
| 2017/0320196 A1 * | 11/2017 | Wolfe | B25B 13/56 |

FOREIGN PATENT DOCUMENTS

DE    102015001239 A1 *    8/2016    ......... B25B 13/5091

* cited by examiner

*Primary Examiner* — Orlando E Aviles
*Assistant Examiner* — Jonathan G Santiago Martinez
(74) *Attorney, Agent, or Firm* — Francis Law Firm PLLC; James M. Francis

(57) ABSTRACT

A socket having an offset drive keyway for transmitting torque to asymmetric fastener heads to facilitate their rotation by applying torque across the fastener end to minimize stress on the fastener end-fastener shaft joint.

6 Claims, 4 Drawing Sheets

US 11,207,761 B2

SOCKET FOR DRIVING ASYMMETRIC FASTENER HEADS

RELATED APPLICATIONS

This application claims the benefit of U.S. Provisional Patent Application 62/597,547 filed on Dec. 12, 2018.

TECHNICAL FIELD

This application relates to tools for driving fasteners, more particularly a socket for use with a socket wrench for driving gate hinge pins.

BACKGROUND

The present invention in general relates to a socket. More particularly, it relates to a socket used in conjunction with a socket wrench for receiving asymmetric fastener heads and used for tightening, loosening, and removing driven screws and bolts.

Sockets are one of the most commonly used mechanical tools for driving fasteners, e.g. screws and bolts. The ratchet wrench with interchangeable socket is first described in U.S. Pat. No. 38,914 to J. J. Richardson, entitled Wrench. The Richardson patent first disclosed a ratcheting wrench, i.e. a socket wrench, with a cuboidal drive, i.e. square drive, for receiving removable sockets. A socket wrench is most commonly a handle with a 90° ratchet, along with a set of cylinder shaped sockets of various diameters and depths. Socket wrenches can utilize geared or gearless ratchets and are typically reversible.

Existing sockets were designed to drive fasteners having a substantially symmetrical head configured to expand around the fastener's longitudinal axis. However, not all fasteners possess symmetrical heads. One example is the common gate hinge which possesses a lag screw body having a head possessing an elongated arm running from the driven end of the fastener at a 90° angle to the fastener's longitudinal axis. A traditional socket possesses 6 or 12 equal sides to grip traditional fastener heads and would be unable to drive a gate hinge pin. Gate hinge pins are currently driven using pliers, which is very labor intensive and a time-consuming process. A socket wrench adapted to drive an asymmetric fastener head would permit the user to turn a fastener without repositioning the tool on the fastener. Thus, there is a longstanding need to design insert adapters which can be driven by a single socket driver efficiently to operate on a large range of fastener heads of different sizes and shapes.

SUMMARY

The present invention is a socket for transmitting torque to a fastener having an offset head for the purpose of driving a fastener, e.g. a gate hinge pin, by transmitting torque to the fastener shaft through a fastener head. An asymmetric, or irregular, fastener head may be driven by the disclosed socket. The socket preferably incorporates an elongated socket body. The socket body has a fastener head receiving end, i.e. a fastener driving end, having a plurality of internal fastener head engaging surfaces defining an axially facing internal drive, i.e. fastener socket, configured to receive a fastener head. The internal fastener engaging surfaces of the fastener socket are configured to transmit torque to the fastener by engaging the corresponding drive surfaces on the fastener head when it is received into the fastener receiving opening. The socket body also has a socket drive end axially opposite the fastener driving end. The socket drive end possesses an axially facing internal drive opening, i.e. the drive socket keyway, on the socket drive end configured to receive a driving element, typically a drive square on a ratcheting wrench.

DETAILED DESCRIPTION OF THE EMBODIMENTS

Figure 1:
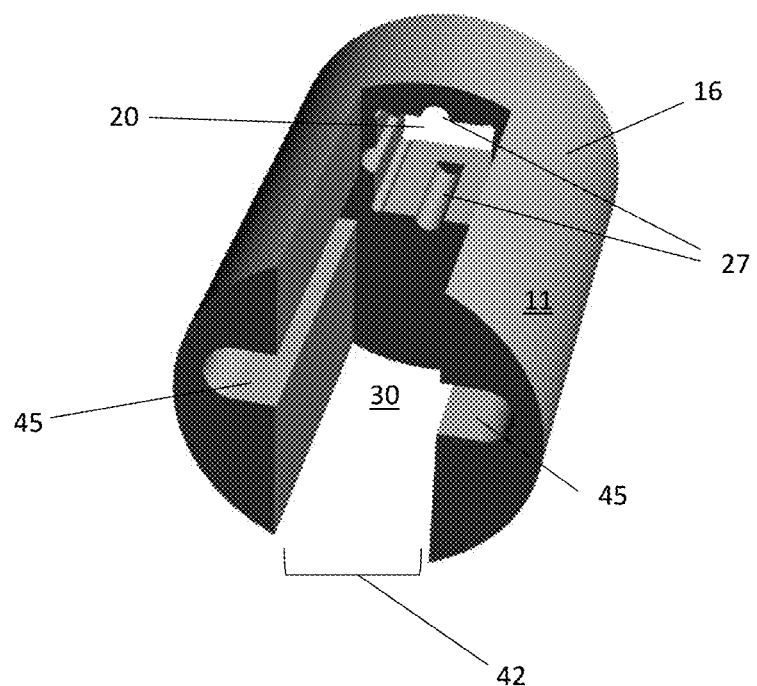
FIG. 1 depicts a fastener engaging end perspective view of the socket.
Figure 2:
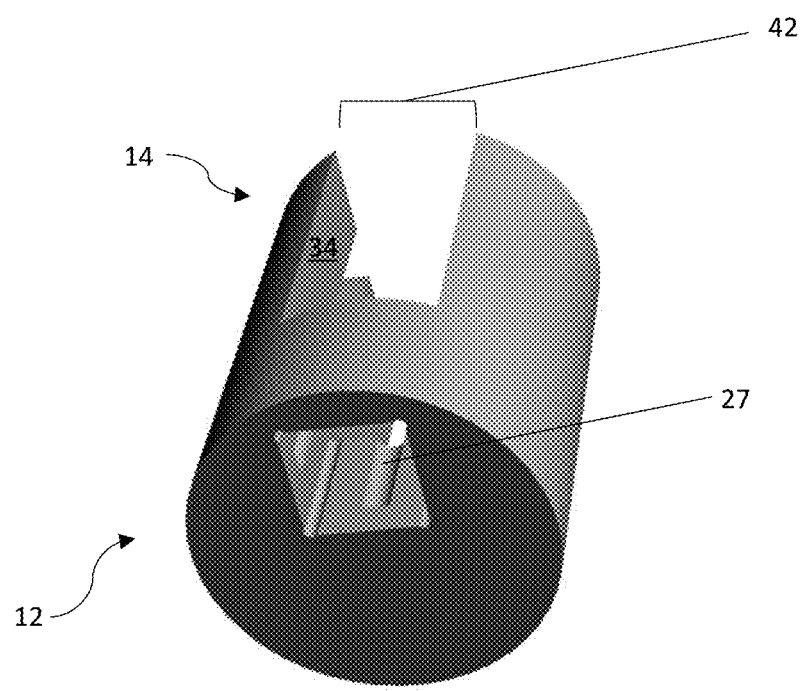
FIG. 2 depicts a drive end perspective view of the socket.
Figure 3:
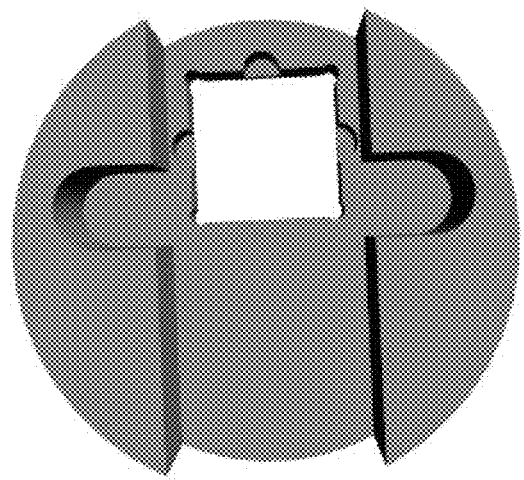
FIG. 3 depicts a fastener engaging end side view of the socket.
Figure 4:
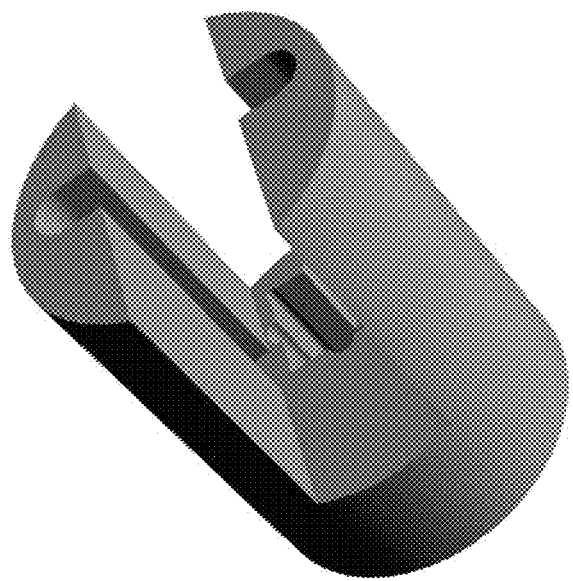
FIG. 4 depicts a fastener engaging end perspective view of the socket.
Figure 5:
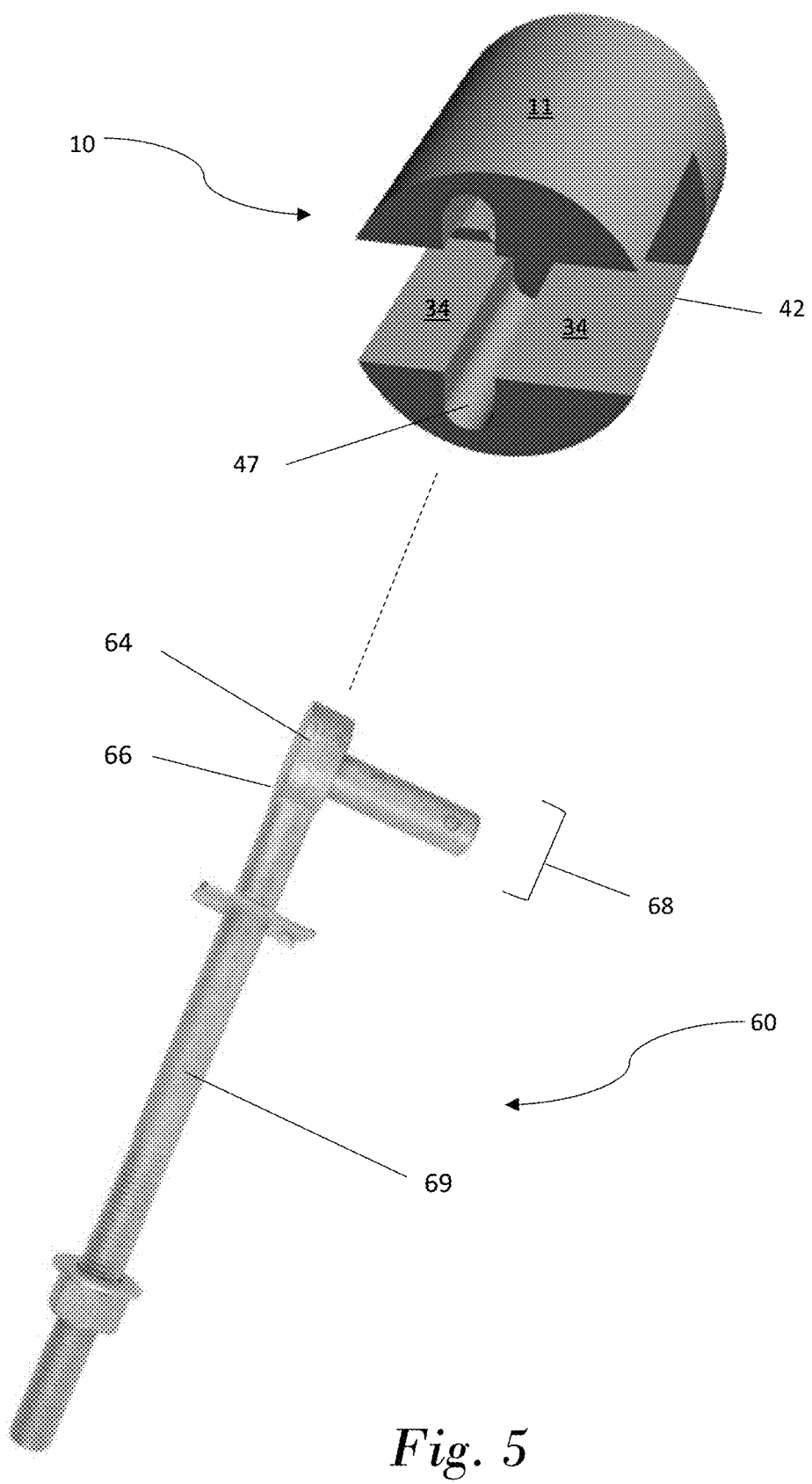
FIG. 5 depicts a fastener engaging end perspective view of the socket engaging an asymmetric fastener.
Figure 6:
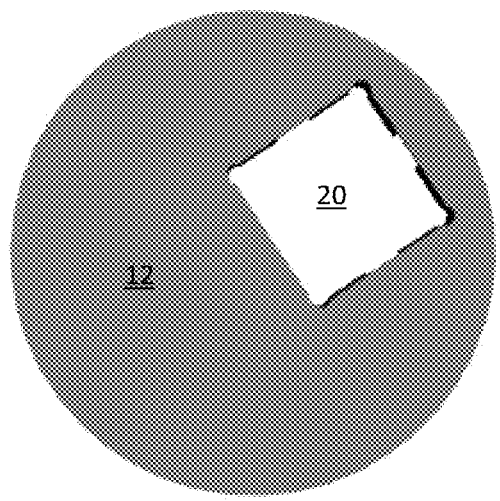
FIG. 6 depicts a drive end side view of the socket.
Figure 7:
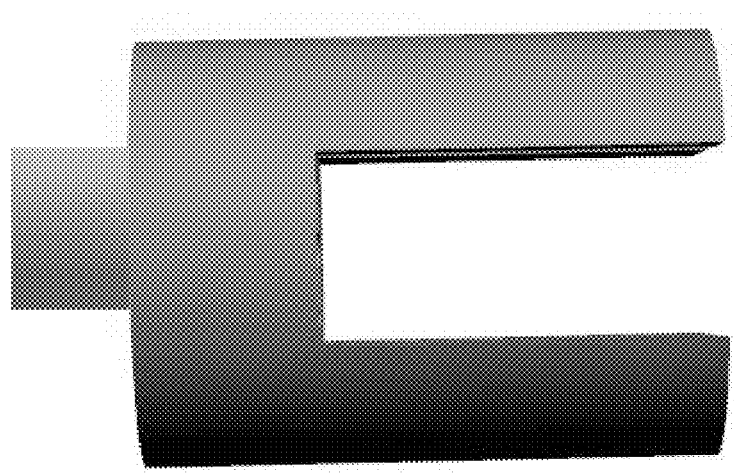
FIG. 7 depicts a side view of the socket with an offset drive key affixed to the drive end.

FIGS. 1-7 illustrate a socket 10 constructed according to an embodiment of the present application. The socket 10 includes an elongated socket body 11 having a fastener engaging end 14 and a drive end 12 axially opposite the fastener engaging end 14, i.e. distal end. The socket body is preferably, but not necessarily, cylindrical. The drive end 12 is ideally constructed and arranged to be removably coupled to a wrench, e.g. a socket wrench, and the fastener engaging end 14, i.e. proximal end, is constructed and arranged to be removably coupled to a fastener of a predetermined size and configuration. As a result, the force applied to the wrench by a user is transmitted as torque to the socket 10 to the fastener head to cause rotation of the fastener.

The socket 10 of the present application has a center of rotation that is offset from the center of the socket along the axis extending from the distal end 12 to the proximal end 14 and aligned with the longitudinal axis of the fastener to be driven. At its distal end, the drive socket keyway 20 is configured to mate with a socket wrench drive. In one embodiment, the drive socket keyway 20 is a square shaped keyway in the socket base to receive a drive key, e.g. drive square, from a socket wrench. Different drive keys may be utilized based on the geometric configuration of the drive socket keyway 22 that receives the drive key. The keyway 22 is preferably sized to fit commercially available socket wrench drives, e.g. ¼ inch, ⅜ inch, and ½ inch. The keyway 22 preferably possesses recesses intended to mate with a spring-loaded detent ball that functions as a positive lock or stop that is commonly used to secure a socket to the drive key of a socket wrench.

In an embodiment, at least one detent ball receiving groove 27 runs from the drive face 24 of the distal end 12 through the keyway 22 to facilitate the receipt and progression of detent balls into and through the keyway 22. The keyway 22 terminates within the interior of the socket body 11. The proximal end 25 of the grooves 27 of the keyway 22 possesses a detent ball stop 29 to secure the socket 10 onto the drive key of the socket wrench so to inhibit the socket 10 from disengaging from the drive key without some action by the user.

The socket body 11 is typically, but not necessarily, a semi-hollow frustum of a geometric shape, e.g. a cylinder.

The proximal end possesses a fastener receiving opening 30 or fastener keyway 30 to receive the end of fastener to which torque will be applied. Within the socket body 11 and extending distally from the fastener receiving opening 30 at the proximal end 14, a fastener receiving opening 30 is defined by a plurality of fastener engaging surfaces 34 to receive and engage the end of the fastener which will receive the applied torque. In an embodiment, the socket body outer wall 16 is slotted wherein part of the fastener end which will receive the applied torque may extend beyond the socket body outer wall 16, which will act as a fastener engaging surface 34, and which permits the fastener end to progress distally from the proximal face toward the distal face to engage the internal fastener engaging surfaces 34. Ideally, the slots are shaped and sized to receive specific fastener ends and to secure the fastener end within the socket so as to efficiently apply torque across the elements of the fastener end, e.g. the pin armature 62 of a gate pin fastener 60.

In the exemplary embodiment of a socket 10 configured to receive a gate pin 40 fastener, the pin armature 62 of the gate pin fastener 60 is received within a pin armature opening 40 in the proximal face 14 and passes distally into the pin armature slot 42 which extends through the socket body outer wall 16 to communicate with the fastener engaging surfaces 34. The pin armature stop 64 of the gate pin fastener 60 is received within the socket body 11 by passing through a pin armature stop slot opening 45 and distally into a pin armature stop slot 47 where the pin armature stop 64 communicates with the fastener engaging surfaces 34. The slots 42, 47 are sized to receive the width and length of the pin armature 62 and the pin armature stop 64 of the gate pin fastener 60, and configured to permit the gate pin fastener 60 to engage the fastener engaging surfaces 34 within the socket body 11 and the socket body outer wall 16.

The slots 42, 47 extend distally into the socket body 11 from the proximal face 14, running parallel to the axis about which the socket body 11 rotates when turned by the rotational movement of the drive key. When properly inserted, the longitudinal axis of the gate pin fastener 60 is parallel to and substantially aligned with the center of rotation of the socket 10 so that both the fastener 60 and the socket body 11 revolve around the same axis.

The socket 10 permits the application of torque from the wrench to the fastener through the application of force to the driven fastener end as communicated through the fastener engaging surfaces 34 of the socket body 11. This permits the socket 10 to reduce the amount of force required to drive a fastener into a substrate despite the existence of asymmetrical elements on the driven end of a fastener, i.e. the asymmetric fastener head, that prevent it from being received into a typical socket 10. In the example of a gate pin fastener 60 the user is required to use pliers to turn the gate pin fastener 60 by applying torque to the pin armature 62 and/or pin armature stop 64, risking the alignment and/or surface integrity of the pin armature 62. However, this conveys the rotational stress to the fastener shaft/pin armature stop joint 66 of the gate fastener pin 60 or any similar fastener having an asymmetric fastener end 68. The application of torque to the drive surfaces of the asymmetric fastener head 68 distributes torque across the asymmetric fastener head rather than a fastener shaft/fastener end joint 66 between the fastener shaft 69 and the fastener end 68. The secure engagement of an asymmetric fastener end 68 inhibits excessive wear to a fastener head and provides improved control of an asymmetric fastener when it is being driven.

Further embodiments of the socket are intended to encompass other asymmetrical fastener heads. The key principle being the use of a socket having an offset key way that aligns with the longitudinal axis of the fastener and the remaining body of the socket having a geometry configured to receive and secure an asymmetrical head, preferably to permit the distribution of torque outside of a single plane of rotation and to take advantage of unique fastener end geometries that would typically not be amenable to use with a socket wrench.

The socket is preferably manufactured of a material that is harder than the fastener and most preferably from steel or a steel alloy. The socket is preferably deep enough to allow the entire fastener end to be inserted within the socket body 11 to permit the application of torque across the entire fastener end so that the fastener shaft/fastener end joint lies within the socket body 11. Preferably, the socket is deep enough to seat the fastener head adjacent to the drive socket 20 to enhance stability.

The provided example of a gate hinge pin as the driven fastener is intended only for exemplary purposes only and is not intended to limit the scope of the device to gate hinge pins. Alternative embodiments are understood to become obvious to one skilled and the art upon reading this disclosure.

What is claimed is:

1. A socket for transmitting torque to a fastener, comprising:
    a. a socket body; said socket body having a fastener drive end with a plurality of internal fastener engaging surfaces defining an axially facing fastener keyway configured to receive an asymmetric fastener head, said fastener engaging surfaces being configured to engage said fastener head so as to transmit torque from said socket body to said asymmetric fastener head when received into said fastener keyway; and
    b. a socket drive end arranged axially opposite said fastener drive end, said socket drive end configured with a drive element consisting of at least one of a drive keyway and a drive key arranged to couple with a torque inducing mechanism, said drive element being offset from the axial center so as to cause said socket body to rotate about a non-central axis extending distally through said socket body through the center of said drive socket from said drive end of said socket body to said fastener end of said socket body and parallel to an axis extending distally through the center of said socket body from said drive end of said socket body to said fastener end of said socket body.

2. The device of claim 1, wherein said socket body is configured with at least one of said internal fastener engaging surface extending from said fastener drive end of said socket body to said socket drive end of said socket body.

3. The device of claim 2, wherein said at least one internal fastener engaging surface possesses at least one orifice configured to receive at least one asymmetric fastener head and which aligns an asymmetric fastener shaft substantially about said socket body's non-central axis of rotation.

4. The device of claim 1, wherein said socket extends distally to V depth where a fastener shaft joint of said asymmetric fastener head that the fastener socket is configured to receive lies between said fastener driving end and said socket drive end.

5. The device of claim 1, wherein said socket body is constructed from metal.

6. The device of claim 5, wherein said socket body is constructed from the group of metals consisting of iron, steel, steel alloys, aluminum, aluminum alloys, titanium, and titanium alloys.

\* \* \* \* \*